US009015377B2

(12) United States Patent
Wu et al.

(10) Patent No.: US 9,015,377 B2
(45) Date of Patent: Apr. 21, 2015

(54) REGISTER FILE ORGANIZATION TO SHARE PROCESS CONTEXT FOR HETEROGENEOUS MULTIPLE PROCESSORS OR JOINT PROCESSOR

(71) Applicants: STMicroelectronics (Beijing) R&D Company Ltd., Beijing (CN); STMicroelectronics, S.r.l., Agrate Brianza (MB) (IT)

(72) Inventors: YongQiang Wu, Bejing (CN); PengFei Zhu, Bejing (CN); HongXia Sun, Bejing (CN); Elio Guidetti, Montano Lucino (IT)

(73) Assignees: STMicroelectronics (Bejing) R&D Company Ltd., Beijing (CN); STMicroelectronics S.R.L., Agrate Brianza (MB) (IT)

( * ) Notice: Subject to any disclaimer, the term of this patent is extended or adjusted under 35 U.S.C. 154(b) by 253 days.

(21) Appl. No.: 13/692,744

(22) Filed: Dec. 3, 2012

(65) Prior Publication Data

US 2013/0173865 A1    Jul. 4, 2013

(30) Foreign Application Priority Data

Dec. 30, 2011    (CN) .......................... 2011 1 0461471

(51) Int. Cl.
*G06F 3/00*    (2006.01)
*G06F 12/08*   (2006.01)
*G06F 9/30*    (2006.01)

(52) U.S. Cl.
CPC ........ *G06F 12/0802* (2013.01); *G06F 9/30098* (2013.01)

(58) Field of Classification Search
CPC .................................................... G06F 12/0802
See application file for complete search history.

(56) References Cited

U.S. PATENT DOCUMENTS

| 7,340,591 | B1 * | 3/2008 | Pechanek et al. | 712/217 |
| 2008/0244289 | A1 * | 10/2008 | LeProwse et al. | 713/320 |
| 2011/0271126 | A1 * | 11/2011 | Hill | 713/320 |

OTHER PUBLICATIONS

Wekipidia.com, Flip-flop (electronics), Oct. 2007, pp. 1-5.*

* cited by examiner

*Primary Examiner* — Hyun Nam
*Assistant Examiner* — Dean Phan
(74) *Attorney, Agent, or Firm* — Allen, Dyer, Doppelt, Milbrath & Gilchrist, P.A.

(57) ABSTRACT

A register file organization is used to support multiple accesses from more than one processor or pipeline. This shared register file is organized for a multiple processor device that includes a high performance (HP) and a low power (LP) core. The shared register file includes separate HP and LP storage units coupled to separate HP and LP write and read ports.

19 Claims, 3 Drawing Sheets

STRUCTURE OF SHARED REGISTER FILE FOR HETEROGENEOUS DUAL CORE PROCESSOR

REGISTER FILE STRUCTURES

STRUCTURE OF SHARED REGISTER FILE FOR HETEROGENEOUS DUAL CORE PROCESSOR

REGISTER FILE STATE TRANSITION

REGISTER FILE ORGANIZATION TO SHARE PROCESS CONTEXT FOR HETEROGENEOUS MULTIPLE PROCESSORS OR JOINT PROCESSOR

RELATED APPLICATION

This application is a translation of and claims the priority benefit of Chinese patent application number 201110461471.9, filed on Dec. 30, 2011, entitled Register File Organization To Share Process Context For Heterogeneous Multiple Processors Or Joint Processor, which is hereby incorporated by reference to the maximum extent allowable by law.

FIELD OF THE INVENTION

This invention generally relates to register file organization, and in particular to register file organization to support multiple access from multiple processors or pipelines.

BACKGROUND OF THE INVENTION

In order to cover a wide range of power and performance requirements with a single chip, a trend is to embed two processor cores together to offer different balances in different running scenarios. Hence, process migration will happen from one core to another when the running scenario is to be changed. To achieve very fast process migration from one processor core to another, shared register files technique could be used to allow one processor core to access the all process contexts written by another processor core. In this way, the process migration can be achieved with almost no latency and no software cost.

However, since the two cores are targeting different timing and power budgets, it is difficult for the shared register files to meet both of the requirements of the two cores. Normally, one core will be designed for very low power dissipation and is very slow, while another core will be high performance and thus dissipates much more power. Due to the CMOS circuit nature, a very fast circuit will use more area, and thus consume more power; on the contrary, an extremely low power circuit should use the minimum area, but its speed is quite poor.

There is further need for a register file organization for a chip that has a very high performance for the high speed core, while having a very low power requirement for the low power core.

SUMMARY OF THE INVENTION

Accordingly, the invention is directed to register file organization to support multiple access from multiple processors or pipelines.

According to an embodiment of the invention, a shared register file comprises a high performance (HP) write port; a low power (LP) write port; a HP storage unit coupled to the HP write port; and a LP storage unit coupled to the LP write port.

According to another embodiment of the invention, a multiple processors chip comprises a high performance (HP) core; a low performance (LP) core; and a shared register file comprising a high performance (HP) write port; a low power (LP) write port; a HP storage unit coupled to the HP write port; and a LP storage unit coupled to the LP write port, wherein the HP write port is coupled to the HP core and the LP write port is coupled to the LP core.

According to a further embodiment of the invention, a method of mode transition for a shared register file comprises in a high performance (HP) mode, writing to both high speed storage units and low speed storage units in the shared register file, and in a low power (LP) mode, writing to only the low power storage units in the shared register file.

The foregoing and other features, utilities and advantages of the invention will be apparent from the following more particular description of an embodiment of the invention as illustrated in the accompanying drawings.

BRIEF DESCRIPTION OF THE DRAWINGS

FIG. 1a illustrates a normal unshared register file. FIG. 1b illustrates a shared register file with multiplexed write ports. FIG. 1c illustrates a doubled port shared register file with multiplexed write ports.

DETAILED DESCRIPTION

Embodiments of the present invention are hereafter described in detail with reference to the accompanying figures and are provided for purposes of illustration only and not for the purpose of limiting the invention as defined by the appended claims and their equivalents. Descriptions of well-known functions and constructions are omitted for clarity and conciseness. The figures are meant to illustrate features of exemplary embodiments of the invention and are not drawn to scale.

A detailed description of the present invention follows, utilizing the accompanying drawings as referenced by the Figures. The preferred embodiments are referenced as each figure is addressed.

Shared register file is a design that allows multiple processor cores, pipelines, or execution units to access the same data set. Normally, the way to create a shared register file is by multiplexing or doubling its ports.

Figure 1:
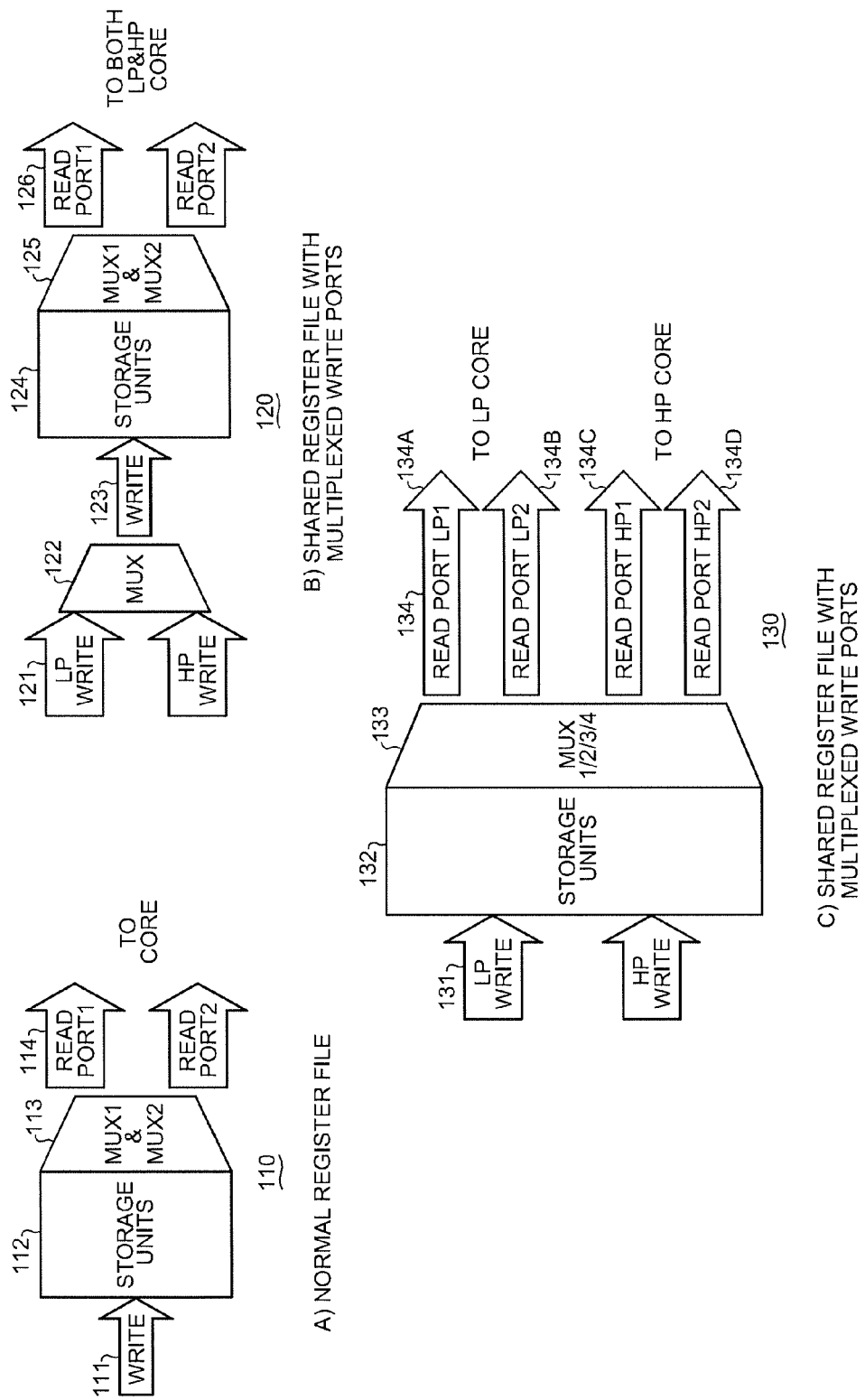
FIG. 1 illustrates examples of one-write-two-read register files.

FIG. 1 shows an example of one-write-two-read register file. While FIG. 1 illustrates limited write and read ports, a register file usually has a multiple of write and read ports.

FIG. 1a shows a normal unshared register file 110. In the normal unshared register file, information are stored to the storage units 112 using indiscriminate write port 111 and are read by the multiple read ports 114 through their respective muxes 113.

FIG. 1b shows a shared register file with multiplexed write ports 120. In the shared register file with multiplexed write ports, low power (LP) and high performance (HP) portions of the chip store information to the storage units through their respective write ports 121. The write ports 121 input to mux 122 to a shared write port 123 to write to shared storage units 124. Shared storage units 124 are read by the multiple read ports 126 through their respective muxes 125.

FIG. 1c shows a doubled port shared register file with multiplexed write ports 130. In the doubled port shared register file with multiplexed write ports, LP and HP portions of the chip store information to storage units 132 through their respective write ports 131. Shared storage units 132 are read by the doubled multiple read ports 134 through their respective muxes 133. The doubled multiple read ports 134 are configured such that there are separate ports for each LP and HP portions of the chip. LP read ports 134A and 134B output to the LP core, and HP read ports 134C and 134D output to the HP core.

The doubled ports style allows the two cores to read/write in parallel, with a cost of dramatically increasing chip area due to the much bigger fanout and the more numerous multiplexer arrays. In the application single ISA heterogeneous multicore processors scenarios, parallel access is not needed; thus, this style is rarely used.

The multiplexed write port is more widely used as it is much simpler than the non-multiplexed version. For read ports, only one fanout is needed to output to another core; for write ports and address ports, multiplexers are needed to select the desired data/address source. Apparently, the storage units and the output multiplexer arrays can be shared among the cores.

However, sharing storage units and multiplexer arrays leads to several drawbacks. The high speed and the low speed cores have different timing requirements such that the shared units would have difficulties meeting both timing requirements. Since the low power core needs to be very low power, the required output delay is quite large; this delay is not able to match the required output delay of the high speed core. On the contrary, if the high speed storage units and multiplexer array are used to meet the need of high speed core, their areas would have to increase significantly. This directly leads to big dynamic and leakage power, conflicting with the requirement of the low power core.

In order to resolve this conflict, one method that can be used is the doubled ports style, which is to use low speed multiplexers for low power core and to use high speed multiplexers for high speed core. However, this method still needs to use the same high speed storage unit with the bigger fanout. Therefore, the power dissipation is still not good enough for the low power core.

In order to achieve both the requirements of high speed core and low power core, a new register file structure uses two sets of storage units and multiplexers. The low power set of storage units is the shadow of high speed storage units.

The novel register file organization eliminates the gap between the two requirements of a dual core high speed/low power chip: very high performance for the high speed core, and very low power requirement for the lower power core. By using two sets of shadow registers and different constraints on these two sets, the novel register file organization is able to satisfy these two requirements. Further, when the low power core is running, only the lower power part of the register file needs to be activated; the other part can be powered off thus further reducing the power requirement.

Figure 2:
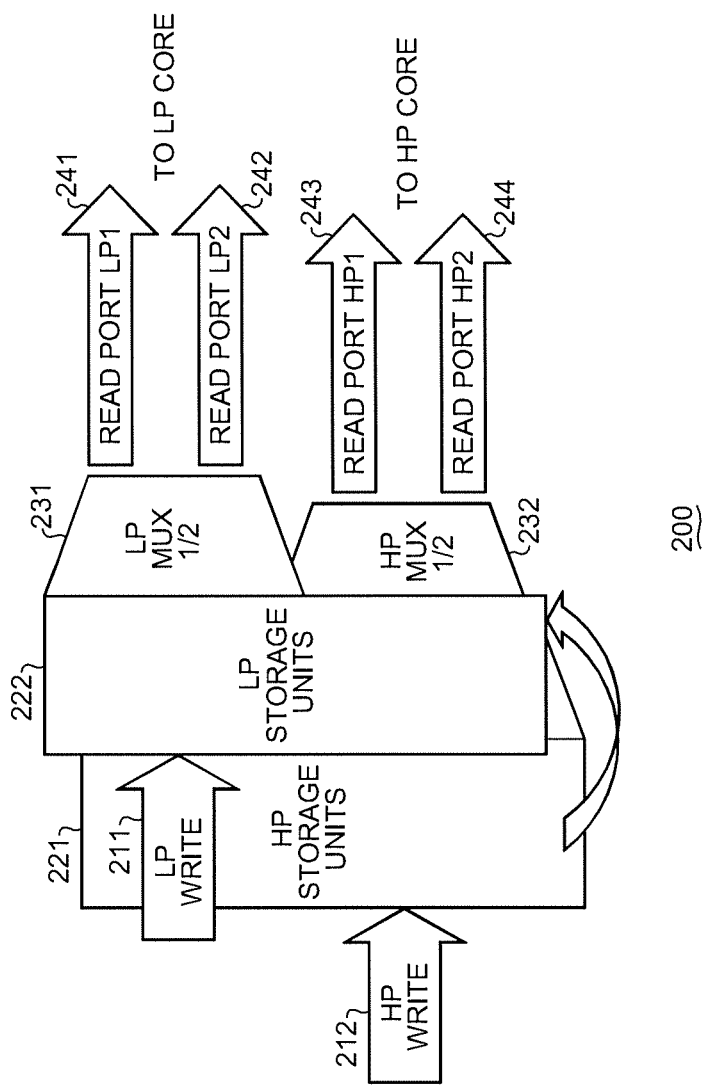
FIG. 2 illustrates a shared register file for heterogeneous dual core process according to an embodiment of the invention.

FIG. 2 shows the structure of the register file organization to share architecture status for heterogeneous dual core processor according to an embodiment of the invention. Note that there are two read ports and one write port for each core in this exemplary embodiment but may be of other configuration as known by one of ordinary skill in the art.

In register file organization structure 200, there are two sets of storage units 221 and 222 (flip-flops) that are connected together. Based on them, there are also corresponding multiplexer arrays 231 and 232 to the read ports 241-244, and the data_input broadcasting network for write ports 211 and 212.

The two storage unit sets include a low power set 222 and a high speed set 221. The low power set consists of slow low power flip-flops, while the high speed set consists of high speed flip-flops. For the corresponding multiplexer arrays for read ports 241-244, the high speed core uses high speed arrays 232 with larger area and power, and the low power core uses low power arrays 231 with longer delay.

Figure 3:
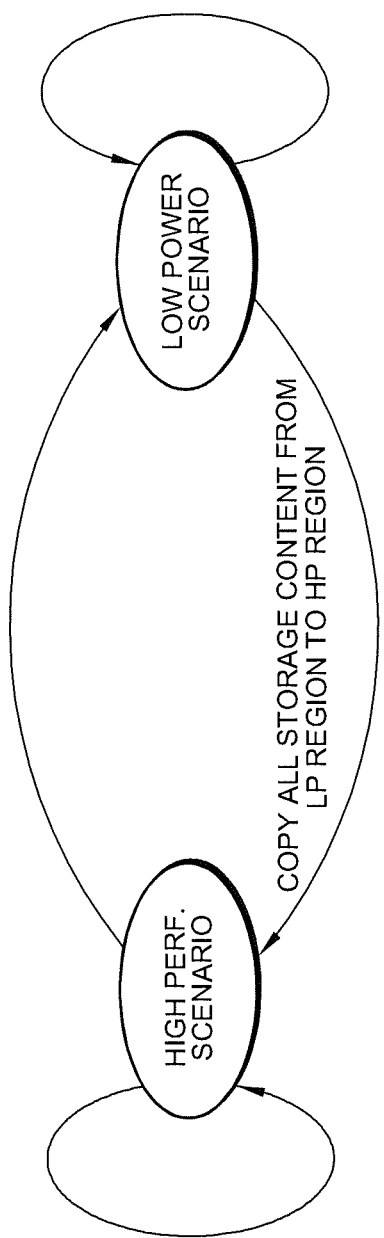
FIG. 3 illustrates register file state transition according to an embodiment of the invention.

There are two working modes: high performance (HP) mode and low power (LP) mode. Apart from them, there is a special action when the processor is changing from LP to HP mode. FIG. 3 illustrates the mode transition according to an embodiment of the invention.

In HP mode, only the high speed core is running, and the low power core is idle. Any write from the high speed core is broadcasted to both the high speed storage units and the low power storage units. Therefore, the two sets of storage units will keep the same value any time. The high speed storage unit drives its values across the high speed multiplexer arrays to the high speed core, so the timing is ensured. Since the low power core is idle, the long delay of low speed multiplexer array does not matter.

In LP mode, only the low power core is running, and the high speed core is idle or power gated. If it is power gated, the high speed storage unit set and the corresponding multiplexer arrays are also power gated in order to reduce the leakage power to the maximum extent. Any write from the low power core is written only to the low power storage units. It then drives the values across the low power multiplexer arrays to the low power core, so the circuit switching power is minimized.

When the processor is going to switch from the LP mode to HP mode, there is a special action. At this time point, the only thing to do is to copy data from low power storage units to high speed storage units in parallel.

When the processor is going to switch from the high speed core to the low power core, nothing special is needed.

While the invention has been particularly shown and described with reference to a preferred embodiment thereof, it will be understood by those skilled in the art that various other changes in the form and details may be made without departing from the spirit and scope of the invention.

A presently preferred embodiment of the present invention and many of its improvements have been described with a degree of particularity. It should be understood that this description has been made by way of example, and that the invention is defined by the scope of the following claims.

We claim:

1. A multi-core device comprising:
    a high performance (HP) core;
    a low performance (LP) core; and
    a shared register circuit coupled between said HP and LP cores and comprising
        a HP write port coupled to the HP core,
        a LP write port coupled to the LP core,
        a HP storage unit coupled to the HP write port, and
        a LP storage unit coupled to the LP write port,
    wherein when in a LP mode, said HP core is idle, and all write operations from said LP core are stored in said LP storage unit,
    wherein when in a HP mode, said LP core is idle, and all write operations from said HP core are stored in both said HP and LP storage units, and
    wherein when transitioning from the LP mode to the HP mode, the stored data in said LP storage unit is copied to said HP storage unit.

2. The multi-core device of claim 1 wherein said shared register circuit comprises:
    a HP read port coupled to the HP storage unit; and
    a LP read port coupled to the LP storage unit.

3. The multi-core device of claim 1 wherein said HP storage unit comprises a plurality thereof coupled to the HP write port; and wherein said LP storage unit comprises a plurality thereof coupled to the LP write port.

4. The multi-core device of claim 3 further comprising:
a plurality of HP multiplexers coupled to the plurality of HP storage units; and
a plurality of LP multiplexers coupled to the plurality of LP storage units;
wherein said HP read port comprises a plurality thereof, each being coupled to a respective HP multiplexer of said plurality thereof; and
wherein said LP read port comprises a plurality thereof, each being coupled to a respective LP multiplexer of said plurality thereof.

5. The multi-core device of claim 1 wherein said HP storage unit and said LP storage unit each comprises a plurality of flip-flops.

6. A method of operating a multi-core device comprising a high performance (HP) core, a low performance (LP) core, and a shared register circuit coupled between the HP and LP cores and comprising a HP write port coupled to the HP core, a LP write port coupled to the LP core, a HP storage unit coupled to the HP write port, and a LP storage unit coupled to the LP write port, the method comprising:
operating the multi-core device while in a LP mode, so that the HP core is idle, and all write operations from the LP core are stored in the LP storage unit;
operating the multi-core device while in a HP mode, so that the LP core is idle, and all write operations from the HP core are stored in both the HP and LP storage units; and
operating the multi-core device to transition from the LP mode to the HP mode and so that the stored data in the LP storage unit is copied to the HP storage unit.

7. The method of claim 6 wherein the shared register circuit comprises:
a HP read port coupled to the HP storage unit; and
a LP read port coupled to the LP storage unit.

8. The method of claim 7 wherein the HP storage unit comprises a plurality thereof coupled to the HP write port; and wherein the LP storage unit comprises a plurality thereof coupled to the LP write port.

9. The method of claim 8 wherein the multi-core device further comprises:
a plurality of HP multiplexers coupled to the plurality of HP storage units;
a plurality of LP multiplexers coupled to the plurality of LP storage units;
wherein the HP read port comprises a plurality thereof, each being coupled to a respective HP multiplexer of the plurality thereof; and
wherein the LP read port comprises a plurality thereof, each being coupled to a respective LP multiplexer of the plurality thereof.

10. The method of claim 6 wherein the HP storage unit and the LP storage unit each comprises a plurality of flip-flops.

11. A non-transitory computer-readable medium having instructions stored thereon which, when executed by a multi-core device, cause the multi-core device to perform a method for operating, the multi-core device comprising a high performance (HP) core, a low performance (LP) core, and a shared register circuit coupled between the HP and LP cores and comprising a HP write port coupled to the HP core, a LP write port coupled to the LP core, a HP storage unit coupled to the HP write port, and a LP storage unit coupled to the LP write port, the method comprising:
operating the multi-core device while in a LP mode, so that the HP core is idle, and all write operations from the LP core are stored in the LP storage unit;
operating the multi-core device while in a HP mode, so that the LP core is idle, and all write operations from the HP core are stored in both the HP and LP storage units; and
operating the multi-core device to transition from the LP mode to the HP mode and so that the stored data in the LP storage unit is copied to the HP storage unit.

12. The non-transitory computer-readable medium of claim 11 wherein the shared register circuit comprises:
a HP read port coupled to the HP storage unit; and
a LP read port coupled to the LP storage unit.

13. The non-transitory computer-readable medium of claim 12 wherein the HP storage unit comprises a plurality thereof coupled to the HP write port; and wherein the LP storage unit comprises a plurality thereof coupled to the LP write port.

14. The non-transitory computer-readable medium of claim 13 wherein the multi-core device further comprises:
a plurality of HP multiplexers coupled to the plurality of HP storage units;
a plurality of LP multiplexers coupled to the plurality of LP storage units;
wherein the HP read port comprises a plurality thereof, each being coupled to a respective HP multiplexer of the plurality thereof; and
wherein the LP read port comprises a plurality thereof, each being coupled to a respective LP multiplexer of the plurality thereof.

15. The non-transitory computer-readable medium of claim 11 wherein the HP storage unit and the LP storage unit each comprises a plurality of flip-flops.

16. A shared register circuit in a multi-core device and coupled between a high performance (HP) core, and a low performance (LP) core, the shared register circuit comprising:
a HP write port coupled to the HP core;
a LP write port coupled to the LP core;
a HP storage unit coupled to the HP write port;
a LP storage unit coupled to the LP write port;
wherein when in a LP mode, said HP core is idle, and all write operations from said LP core are stored in said LP storage unit;
wherein when in a HP mode, said LP core is idle, and all write operations from said HP core are stored in both said HP and LP storage units; and
wherein when transitioning from the LP mode to the HP mode, the stored data in said LP storage unit is copied to said HP storage unit.

17. The shared register circuit of claim 16 wherein said shared register circuit comprises:
a HP read port coupled to the HP storage unit; and
a LP read port coupled to the LP storage unit.

18. The shared register circuit of claim 17 wherein said HP storage unit comprises a plurality thereof coupled to the HP write port; and wherein said LP storage unit comprises a plurality thereof coupled to the LP write port.

19. The shared register circuit of claim 18 further comprising:
a plurality of HP multiplexers coupled to the plurality of HP storage units; and
a plurality of LP multiplexers coupled to the plurality of LP storage units;
wherein said HP read port comprises a plurality thereof, each being coupled to a respective HP multiplexer of said plurality thereof; and
wherein said LP read port comprises a plurality thereof, each being coupled to a respective LP multiplexer of said plurality thereof.

* * * * *